United States Patent [19]

Bilsbury et al.

[11] Patent Number: 5,665,808
[45] Date of Patent: Sep. 9, 1997

US005665808A

[54] LOW TOXICITY COMPOSITE BULLET AND MATERIAL THEREFOR

[76] Inventors: Stephen J. Bilsbury, 1225 State St., Alton,, Ill. 62002; Bruce E. Burdick, 3656 Western Ave., Alton, Ill. 62002-3156

[21] Appl. No.: 370,661

[22] Filed: Jan. 10, 1995

[51] Int. Cl.$^6$ .................................................. C08K 3/08
[52] U.S. Cl. ...................... 524/439; 102/501; 102/506; 102/517; 102/529; 524/440
[58] Field of Search ................................. 524/439, 440; 102/501, 506, 517, 529

[56] References Cited

U.S. PATENT DOCUMENTS

| | | | |
|---|---|---|---|
| 2,995,090 | 8/1961 | Daubenspeck | 102/91 |
| 3,123,003 | 3/1964 | Lange et al. | 102/91 |
| 3,785,293 | 1/1974 | Barr et al. | 102/92.7 |
| 4,027,594 | 6/1977 | Olin et al. | 102/92.4 |
| 4,466,330 | 8/1984 | Juretzek et al. | 86/20 R |
| 4,479,438 | 10/1984 | Bilsbury | 102/454 |
| 4,603,637 | 8/1986 | Snide et al. | 102/529 |
| 5,237,930 | 8/1993 | Belanger et al. | 102/529 |

*Primary Examiner*—Edward J. Cain
*Attorney, Agent, or Firm*—Bruce Burdick

[57] ABSTRACT

A low toxicity, high density composite bullet material is disclosed and its use in a practice ammunition projectile. The material includes a compacted mixture of fine lead particles each encapsulated by a non toxic thermoplastic resin. The mixture which is compacted and formed by compression molding or injection molding, has a specific density of at least 7.

22 Claims, No Drawings

LOW TOXICITY COMPOSITE BULLET AND MATERIAL THEREFOR

BACKGROUND OF THE INVENTION

1. Field of the Invention

This invention relates ammunition and more particularly to a low toxicity composite bullet and a composite low toxicity material useful in manufacture of bullets and other high dentistry applications where toxicity of lead is a concern. Another aspect of this invention relates to a material which has an elastic matrix and a relatively plastic metal filler characterized by a relatively high density.

2. Related Art

The use of lead bullets is known. These can be of several currently available types. One is a copper jacketed lead bullet which is basically identical to service ammunition. Another is a solid lead bullet and still another is a frangible composite lead gallery bullet.

Also known are composite bullets of materials other than lead such the copper frangible gallery bullet of U.S. Pat. No. 5,237,930 issued Aug. 24, 1993 to Belanger et al. Such composite bullets are characterized by the use of powders of various metals other than lead consolidated into a bullet having sufficient strength for use and intended to be disrupted into small fragments on impact with a gallery target.

The costs associated with the training of users of ammunition can be extremely high.

Airborne lead contamination is associated with the use of conventional ammunition. During a shooting session, there is an emission of lead dust into the atmosphere. Measurements of airborne lead, taken at various periods of time in different target ranges have definitely established that high lead concentrations exist. It has also been determined that these concentrations, in many cases, are well above the minimum safe level for human consumption. The concentration of airborne lead is dependent upon several variables such as; the volume of air removed from the range on a continuous basis, amount of cartridges fired per hour, size of the facility, and cartridge type. As may be appreciated, changing some of these variables would involve large capital expenditures, the money for which is simply not available for the purpose of reducing airborne lead, especially considering that many of the ranges are financed by private range owners who are limited in what they can charge their customers. The simple political solution for private ranges is to close them down by edict. This deprives the ordinary citizen of his or her right to keep and bear arms because if he or she cannot practice, he or she becomes ineffective and therefore unsafe and dangerous to others. The solution for police and military is not nearly as simple. They must be able to practice in order to be proficient and safe to the populace. Because of geography, or capital expense, they are forced to practice in unsafe conditions.

Airborne lead comes from the following sources: (1) lead from the lead styphnate in primer mixes, (2) lead from the base of the bullet exposed briefly to high propellant combustion temperatures, (3) lead removed by the lands and grooves of the barrel as the bullet moves, and (4) lead from the impact zone behind the targets.

In large caliber bullets most of the airborne lead in the target range can be prevented by using a copper jacket at the base (rear end) and bourrelet of the bullet and using a lead free primer, airborne lead still occurs, however, at the target. Copper jackets are not suitable for small caliber ammunition such as 0.22 rimfire because the jacket makes it difficult to crimp and takes up volume thus reducing projectile density.

The use of other materials has been examined an depth. The principle problems with other materials are density, strength and cost. Few materials equal or exceed lead in density and those that do are, comparatively, quite expensive or have too little or too much strength. Copper is the closest of the materials available at moderate cost increase, but is simply too low an density. U.S. Pat. No. 5,127,322 issued Aug. 24, 1993 to Belanger et al. discloses a copper and nylon composite frangible bullet with a density of slightly over 50% of the density of lead in the bullets sought to be duplicated. As a result, Belanger et al had to redesign both the bullet and cartridge case of the ammunition in which it was used in order to achieve operability of some of the weapons with which the projectile might be used.

In order for a round to cycle an autoloader, a minimum amount of energy must be delivered to the cycling mechanism. For some types of weapons, this energy as delivered by the expanding gases pushing back the receiver as in the Colt 0.45 ACP pistol for example. For others, high pressure gas behind the bullet passes through a port inside the barrel to the cycling mechanism as in the Colt M16 rifle.

Propellant powders are designed to work with a projectile of a certain mass that provides a typical pressure-vs-time curve. Using a lighter projectile will also cause problems, the main one being too low an energy transfer to give the feeding mechanism the needed momentum to cycle in certain types of weapons at standard velocity regimes. Thus, with lighter projectiles, to make recoil mechanisms of many currently used guns function, the projectiles have to be made to go much faster to provide sufficient energy transfer. This requires powders that burn faster. The combination of fast powders and lightweight projectiles can dangerously exceed recognized chamber pressure standards. The higher than design linear velocities of the bullets are inherently coupled with higher than design spin velocities thus resulting in poorer accuracy and increased centrifugal forces. With these less dense materials, the bullet cannot be brought up to its former weight by increasing its length forward of the cartridge case due to the dimensional limitations imposed by the standard gun chambers into which the bullet must fit. A bullet that would require rechambering the gun would not be acceptable to many gun owners because the weapon would no longer be optimal for standard ammunition. Increasing bullet volume by extending the bullet length further into the cartridge case is not acceptable because most modern cartridges are fully loaded with powder and this would require either substantially altering the powder speed (changing powder type) or decreasing velocity and thus either exceeding chamber pressure standards and chancing blowing up the gun or having it fail to function. Neither of these choices are commercially viable.

For bullets, lower density almost invariably translates into poorer performance in terms of accuracy. Needless to say, an inaccurate bullet is not a marketable item.

Ideally, a material is sought which has the same or very close to the same density as lead, yet which does not allow significant airborne lead to occur in the target range. The present invention provides that material.

SUMMARY OF THE INVENTION

It is in view of the above problems that the present invention was developed. The invention provides a composite material of lead particles each of which is completely encapsulated in a thermo plastic matrix using conventional molding technology. The advantages of the density of lead are thus retained while containing the lead in an inert barrier for environmental protection. Densities of approximately 65% of that of lead are achieved (Belanger et al achieved about 50%) using the same mixture proportions as the Belanger et al patent.

It is an object of the present invention to provide a low toxicity, low cost, high density replacement material for presently used practice ammunition. This can be achieved by using a compacted mixture of fine lead powder and of a thermoplastic resin. Lead having a specific gravity of 11.34 grams per cubic centimeter (gm/cc) cannot be matched with equivalent metals available at an affordable cost. The choice of a lead composite is the most economic approach to generate a replacement material to solid lead or currently available frangible lead composites. This replacement material provides added value, such as significantly less toxicity or pollutant.

Further features and advantages of the present invention, as well as the structure and operation of various embodiments of the present invention, are described below in detail.

Another advantage of this material is the capability of coloring either by incorporating a colorant into the plastic or by painting after forming, since the plastic is readily painted. This advantage may be important in order to rapidly distinguish between practice ammunition and ordinary ammunition, and such rapid distinguishment may be very important for self-preservation and safety when rushing to grab gun and ammunition to respond to an imminent threat.

DESCRIPTION OF THE PREFERRED EMBODIMENTS

No drawings are needed for the present inventions, but the drawings of U.S. Pat. No. 5,237,930 may be referred to by those unfamiliar with the bullet arts as background information.

Since lead is considerably more malleable than copper and since the volume percent of plastic matrix material in the composite is approximately 40% (by volume or about 7% by weight) in Belanger et al, the composite density can be significantly increased over that of Belanger et al by varying the filler material of the composite and/or reducing the amount of plastic in the composite. Density advantages relative to Belanger et al. are achieved at all volume proportions of lead in the mixture when compared to the same volume proportions of the copper. In fact, the density achieved by Belanger et al. using 60% copper filler can be achieved by using less than 50% lead filler. However, to maximize the specific gravity of the composite, the volume proportion of lead in the mixture would preferably be over 50%, and more preferably over 60%.

Competing against the density raising caused by increased amounts of lead is the desire to provide sufficient encapsulation of the lead particles to minimize the amount of lead which becomes exposed during firing, flight and impact to the environment. It is an advantage of the present invention that the matrix material completely surrounds and encapsulates the relatively heavy plastic metal filler. As noted above, for a given dentistry bullet more plastic can be used when the filler metal is lead, thus enhancing the encapsulation. However, due to the highly ductile nature of lead, it is believed that less plastic is needed.

We expect that having 30–50% by volume plastic achieves both sufficient density of the composite material and sufficient thickness of the microencapsulation layer surrounding the individual particles of lead.

A compacted mixture containing 60% by volume of fine lead powder in a Polyethylene Terephthalate (PET) or Polybutylene Terephthalate (PBT) matrix would have a specific gravity of at least 7.36 gm/cc. This is an increase of more than 28% in specific gravity over the same percentage by volume of copper filler material. If this could be increased to 70%, the specific gravity would increase to 8.26 gm/cc which is higher than the density of the steel shot which is in current use as a standard firearm projectile material and which is a density increase of more than 43% over that of the. Belanger composite. By "fine" is meant a particle size less than no. 12 shot.

For ammunition applications, there are several suitable readily available low cost thermoplastic molding resins such as, for example, PET (polyethylene terephthalate) and PBT (polybutylene terephthalate). It will be understood that reference to PBT and PET in this specification and the claims below is not strictly limited to PBT and PET, but would include any thermoplastic molding resin compatible with lead which achieves the purpose of this invention, recognizing that new resins or alloys are constantly being developed. The thermoplastic molding resin preferably has physical properties (other than melting point which must be lower than the melting point of lead) which are relatively close to those of lead so as to minimize the effects of bullet molding processes and shooting forces on the integrity of the encapsulation of the lead. Lead has certain physical properties that are relevant to this consideration, among which are: (a) extremely high ductility, (b) negligible elasticity, (c) high density, and (d) low cost. Reference to manuals such as the Modern Plastics Encyclopedia (published annually by McGraw-Hill) will supply the relevant comparable properties of plastics. New mixtures of polymers are continually being developed and this invention envisions the use of new any of such polymers which have properties closely approximating those of lead (except melting point, which should be lower as noted above.)

A compacted mixture of lead and PBT/PET wherein lead is at least 90% of the mixture by weight can be achieved by either compression or injection molding.

One characteristic of a composite microencapsulated lead particle training round is that it would tend to break up into small particles or fragments when hitting a hard surface, like a steel plate. Each of these smaller fragments or particles is much less likely to carry enough energy to be considered as a dangerous projectile. On the other hand, the composite projectile should be sufficiently impact resistant to withstand the "launch forces" (high centrifugal and longitudinal accelerations) that occur on firing, plus the deformations ("engraving") that result from engaging weapon rifling and being rotationally accelerated by that rifling.

PBT (with water absorption at saturation of 0.4–0.5% and a coefficient of linear thermal expansion of $60-95\times10^{-6}$) and PET (with a water absorption at saturation of 0.2– 0.3% and a coefficient of linear thermal expansion of $65\times10^{-6}$) are dimensionally more stable than nylon 11(with water absorption at saturation of 1.9% and a coefficient of linear thermal expansion of $100\times10^{-6}$) and also in contrast to nylon 11 or 12, are commodity resins rather than specialty resins this means lower cost. Thus for good accuracy, the projectile diameter need not be oversized by 0.001 inch to 0.002 inch, compared to a standard projectile, as was stated to be the case with copper composites of U.S. Pat. No. 5,237,930. This avoids both the need for larger bullet diameter in order to make the projectile fully engage the rifling of the barrel and the need to reduce the inside diameter of the cartridge case with resultant residual tensile stresses on same. Dimensional control can therefore be less strict for the projectile diameter than with other lead substitutes. Maximum allowable variation would be the same as for standard lead bullets. Higher projectile diameters such as those in the Belanger et al. patent may delay the start of bullet movement during launch, resulting in higher chamber pressures, while lower diameter will lead to poor accuracy.

Another important dimensional criteria is the volume of the projectile which should be optimized in order to obtain the heaviest projectile possible. With other alternate composite materials, developers have had to work with ogive configurations and bullet lengths to try to achieve more volume while still maintaining sufficient gyroscopic stability. With this lead-plastic composite, that undesirable need to modify the bullet is eliminated or drastically reduced. For example, with the present invention a projectile shorter than the 0.675 inches referenced as the minimum satisfactory length in U.S. Pat. No. 5,237,930 should be adequate for a 9 mm bullet. And, for a 0.675" projectile the weight would exceed 100 grains (a standard weight for 9 mm bullets). Thus, in contrast to a non-standard underweight 85 grain bullet in U.S. Pat. No. 5,237,930, the present invention can utilize standard weight bullets.

One major difference between the composite referred to in Belanger et al and the material of the present invention is the amount and nature of the difference in the hardness and malleability between the metal and the matrix of the composite.

Copper is very hard compared to nylon and although known as a ductile metal, is considerably less ductile than nylon. As a result, the copper particles serve as stress risers within the nylon matrix. This weakens the composite and limits the weight percentage of copper to about 93% (i.e. the volume percent copper to about 60%) as disclosed by Belanger et al.

On the other hand, lead is very soft and malleable and more closely matches the hardness of the matrix material. Since the deformation characteristics of the lead more closely approximate those of the surrounding matrix, the lead particles are no longer stress risers but are, in fact, reinforcements of the matrix. This allows a higher weight percentage of lead than of other harder reinforcements or fillers.

Reference to weight percentage in a composite of this nature can mislead one to believe that the volume percentage of the heavier material is much higher than is actually the case and that a limit is being approached. For example: the Belanger et al patent disclosed a weight percent of 93% copper, which appears to be approaching 100% However, this is only about 60% copper by volume, since copper is about nine times as heavy as the nylon 11 or nylon 12 matrix.

By comparison, for 60% lead 40% PBT by volume in the present invention, the density of the composite is 7.36 gms/cc versus 5.76 for the copper nylon matrix. Thus, by merely substituting lead and PBT and/or PET for copper and nylon 11 without changing the volume % of filler in the composite, a density increase of 28% is achieved even though the "weight percent" of filler in the composite would actually be decreased from 93.5% to 92.3%, again pointing out the deceptiveness of references to increase in "weight percent." As stated in Belanger et al, 5.7 gms/cc is a marginal density for operability of many weapons. In fact, Belanger et al had to alter the bullet geometry to make it work even at that density. If the density is increased by 30%, the bullet geometry can remain relatively unchanged and the bullet performance becomes reliable rather than marginal. This is commercially important.

Belanger et al stated that when increasing the metal filler content of a metal-polymer composite, to amounts less than 60% by weight, the specific gravity increases relatively linearly. That is really quite irrelevant, because at 60% copper by weight in the composite material, the specific gravity of the material is only about 2 gm/cc, which is too low for a bullet. Beyond 60%, the specific gravity starts increasing exponentially in relation to increases in percentage of filler metal because of the density differential. This effect is even more pronounced for lead than for copper. For example, between 88% and 93% by weight of lead loading (only a 5.4% increase), for lead filler, a 28.4% density increase is obtained in contrast to an 18.6% dentistry increase for the same percentage copper filler increase.

When a plastic or polymer is highly filled with finely divided metals, the resulting composite material usually provides qualities not found in either the plastic or metal alone. In the present invention, the environmental protection provided by the plastic or polymer is a quality not found in lead alone and is, in fact, the main reason for the invention. It is, however, recognized that other desirable properties may be provided by the lead/plastic composite and that those are part of the invention in that they would be readily found upon routine use of the material of the invention. For example, disposal of ballistic sand from ranges might be either delayed or simplified if the lead contained therein is encapsulated and thus more friendly to the environment.

The processing technology under the present invention relates to mixing finely divided metals in particulate or powder forms with polymer.

The particular material of the present invention can be classified as a metal polymer composite due to its composition which includes:

(1) a metal filler: ultra fine lead powder; and (2) a binder: thermoplastic polymer resin.

There exist at least two methods of manufacture of this material. The first is adapted to injection molding while the second method, which is currently preferred, is adapted to compression molding.

METHOD A (INJECTION MOLDING):

The metal filler and binder components are mixed, homogenized and made up in granules in accordance with a procedure such as the following steps:

a) raw materials are pre-weighed according to the determined final mix;

b) the metal particles are precoated with a dilute solution of polymer and then dried.

c) then, there is dry blending or tumbling of the precoated dry metal particles, polymer particles and additives using conventional techniques for materials of different densities;

d) a thermal blending or combination of solid particles is prepared with the use of equipment which will mix together materials of different density into a uniform single homogeneous mass;

e) a screw extruder is used to optimize the quality of the extruded composite mass. Temperatures are attained to melt the polymer, adhesively bonding it to the outer precoated layer of the precoated metallic particles. A conventional twin-screw extruder is preferably used to extrude the compound;

f) the output passes through a dicing chopper, or pelletizer, which delivers the material in a form suitable for feeding the hoppers of injection molding machines.

However, this first method has at least four significant drawbacks:

1st) Multiple processing steps degrade the polymer chain length thus reducing the strength of the material;

2nd) In order to process the material through an injection molding machine, a high volume percent of matrix material is needed as the fluid medium to carry the heavier metal filer (for example, in Belanger the 93% by weight copper—7% by weight nylon 11 mixture is 50% by volume nylon 11);

3rd) The copper is much harder than the nylon 11 under compression, so that even under maximum compression (when the copper spheroids are in contact which each other) there exists a significant interstitial volume which limits a further increase in density; and 4th) The copper spheroid, because they are harder and have a higher modulus of elasticity than nylon 11, serve as stress risers thus further decreasing the strength of the overall composite material.

METHOD B (COMPRESSION MOLDING):

In order to maximize density and significantly reduce toxicity another method and different materials are preferable to be used in order to eliminate the limitations noted above. The preferred method is as follows:

first, a fine lead powder is coated (for example by immersion, spraying, brush application, roller application, etc.) with a solution of solvent (for example, hexaflouroisopropanol) and polymer (for example, polybutylene terephthalate or "PBT");

second, the solvent is driven off by any suitable method such as air drying from the solution coating the lead particles to produce lead particles relatively uniformly encapsulated with PBT and this step could be repeated for additional thickness of coating, if desired; and third, the encapsulated particles are placed in a cavity of a desired shape and compressed to form the composite in the desired shape. If desired, additional PBT particles might be blended with the encapsulated lead particles prior to compression.

Since pressure can be equated to heat and since the melt temperature of PBT is 225°–275° C. and the melting temperature of lead is 327° C., the mass can be consolidated with minimal interstitial void space as the PBT melts and the lead deforms.

It will be appreciated that other materials or combinations thereof may be used to achieve similar results. This consolidated material can be used (with only minor adjustments) on standard bullet making equipment. A bullet manufacturer should be able to obtain such a material from current material manufacturers after they are provided the details of this invention as described herein. This will minimize capital investment for new bullet manufacturing equipment when incorporating this process.

In view of the foregoing, it will be seen that the stated objects of the invention are achieved. The above description explains the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description shall be interpreted as illustrative rather than limiting. Thus, the breadth and scope of the present invention should not be limited by any of the above-described exemplary embodiments, but should be defined only in accordance with the following claims appended hereto and their equivalents.

The patents referenced herein are incorporated in their entirety for purposes of background information and additional enablement.

What is claimed is:

1. A practice ammunition comprising a compacted mixture of fine lead powder and of a inert, acid-resistant, non-toxic thermoplastic resin; the fine lead powder having a particle size of less than no. 12 shot and being greater than 90% of the mixture by weight; the mixture having a minimum specific gravity of 7.0; and the resin encapsulating the lead particles to minimize the lead exposure to the surrounding environment.

2. A practice ammunition as defined in claim 1, wherein said mixture is an injection molded compacted material.

3. A practice ammunition as defined in claim 1, wherein said lead powder consists of particles having essentially a spheroidal shape before processing.

4. A practice ammunition as defined in claim 1, wherein said fine lead powder is greater than 93.5% by weight.

5. A practice ammunition as defined in claim 4, wherein said thermoplastic resin is about, 4–10% by weight.

6. A practice ammunition as defined in claim 1, further comprising a lubricant.

7. A practice ammunition as defined in claim 1, further comprising a wetting agent.

8. A composite material comprising a compacted mixture of from about 60% to about 75% by volume fine lead powder and from about 25% to about 40% by volume inert, acid-resistant, non-toxic thermoplastic resin, wherein the composite material has a specific gravity of at least 7.0, end wherein the lead particles are surrounded by the non-toxic material to minimize lead pollution of surrounding environment.

9. A method of making a composite material of a desired shape and size, which comprises the steps of:

first, a fine lead powder is coated with a solution of inert, acid-resistant, non-toxic thermoplastic polymer in a solvent for the polymer;

second, the solvent is removed from the solution coating the lead particles to produce lead particles relatively uniformly encapsulated with polymer;

third, a desired weight of the encapsulated particles are placed in a cavity of a desired shape and compressed to form the composite in the desired shape.

10. The method of claim 9 wherein the solvent is selected from the group consistency essentially of hexafluoroisopropanol, trifluoroacetic acid, phenol/chlorinated aliphatic hydrocarbons, and o-chlorophenol.

11. The method of claim 9 wherein the polymer is selected from the group consisting essentially of PBT and PET.

12. The method of claim 9 wherein the first and second steps are repeated at least once to thicken the coating encapsulating the lead particles prior to the third step.

13. The method of claim 9 wherein a preselected quantity of fine polymer particles are blended with the encapsulated lead particles prior to compression.

14. A method of making a composite material of a desired shape and size, which comprises the steps of:

a) preweighing the raw materials according to a predetermined final mix;

b) precoating the pre-weighed metal particles with a dilute solution of intert, acid-resistant, non-toxic polymer and a solvent;

c) drying the pre-coated metal particles to remove the solvent and leave particles coated with the non-toxic polymer;

d) delivering the precoated metal particles to an injection molding machine; and e) injection molding the pellets into the desired final shape and size.

15. The method of claim 14 wherein the solvent is selected from the group consistency essentially of trifluoroacetic acid, phenol/chlorinated aliphatic hydrocarbons, and o-chlorophenol.

16. The method of claim 14 wherein the polymer is selected from the group consisting essentially of PBT and PET.

17. The method of claim 14, wherein the first and second steps are repeated at least once to thicken the coating encapsulating the lead particles prior to the third step.

18. The method of claim 14 wherein a preselected quantity of fine polymer particles are blended with the encapsulated lead particles prior to injection molding.

19. The method of claim 18 wherein the encapsulated lead particles and polymer particles are blended by dry mixing with any other desired additives to produce a dry mixture prior to injection molding.

20. The method of claim 19 further comprising the step of simultaneously mixing and heating the dry mixture of solid particles to form a uniform single homogeneous mass.

21. The method of claim 20 further comprising the step of screw extruding the homogeneous mass into an extruded homogeneous composite mass while maintaining the temperature of the mass above the melting temperature of the polymer particles so as to adhesively bond the polymer particles to the outer precoated layer of the precoated metallic particles.

22. The method of claim 21 further comprising the step of passing the extruded homogeneous composite mass through a pelletizer to form pellets suitable as feed stock for an injection molding machine prior to injection molding.

* * * * *